United States Patent
Mueller

(10) Patent No.: US 7,684,309 B2
(45) Date of Patent: Mar. 23, 2010

(54) MULTI-PURPOSE HIGH-DENSITY OPTICAL DISC

(75) Inventor: William R. Mueller, Brentwood, TN (US)

(73) Assignee: Cinram International Inc., Scarborough (CA)

( * ) Notice: Subject to any disclaimer, the term of this patent is extended or adjusted under 35 U.S.C. 154(b) by 702 days.

(21) Appl. No.: 11/284,687

(22) Filed: Nov. 22, 2005

(65) Prior Publication Data

US 2007/0098947 A1   May 3, 2007

Related U.S. Application Data

(60) Provisional application No. 60/733,598, filed on Nov. 3, 2005.

(51) Int. Cl.
*G11B 7/24* (2006.01)

(52) U.S. Cl. .............. 369/275.5; 369/275.1; 428/64.1

(58) Field of Classification Search ............ 369/283, 369/275.1–4
See application file for complete search history.

(56) References Cited

U.S. PATENT DOCUMENTS

| | | | |
|---|---|---|---|
| 4,995,799 A | 2/1991 | Hayashi et al. |
| 5,181,081 A | 1/1993 | Suhan |
| 5,247,494 A | 9/1993 | Ohno et al. |
| 5,303,224 A | 4/1994 | Chikuma et al. |
| 5,315,107 A | 5/1994 | Smith et al. |
| 5,457,746 A | 10/1995 | Dolphin |
| 5,540,966 A | 7/1996 | Hintz |
| 5,766,359 A | 6/1998 | Sichmann et al. |
| 5,766,495 A | 6/1998 | Parette |
| 5,792,538 A | 8/1998 | Yurescko-Suhan |
| 5,800,687 A | 9/1998 | Kempf |
| 5,815,333 A | 9/1998 | Yamamoto et al. |
| 5,863,328 A | 1/1999 | Sichmann et al. |
| 5,863,399 A | 1/1999 | Sichmann |
| 5,900,098 A | 5/1999 | Mueller et al. |
| 5,905,798 A | 5/1999 | Nerlikar et al. |
| 5,913,653 A | 6/1999 | Kempf |
| 5,923,640 A | 7/1999 | Takemura et al. |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,949,752 A | 9/1999 | Glynn et al. |

(Continued)

OTHER PUBLICATIONS

U.S. Appl. No. 11/705,682, filed Feb. 13, 2007.

(Continued)

*Primary Examiner*—Tan X Dinh
*Assistant Examiner*—Andrew J Sasinowski
(74) *Attorney, Agent, or Firm*—Cooper & Dunham, LLP

(57) ABSTRACT

An optical recording medium includes a first half-disc and a second half-disc. The first half-disc includes a substrate and an information layer (including a reflective layer) formed on a first side of the substrate. The second half-disc is bonded by an adhesive to a second side of the substrate of the first half-disc. In addition, a cover layer is formed over the first reflective layer. The cover layer has a thickness of approximately 0.1 mm. The substrate of the first half-disc has a thickness in a range of 0.3 mm to 1.0 mm. The first and second half-discs together have a combined thickness in a range of 0.8 mm to 1.3 mm.

25 Claims, 10 Drawing Sheets

U.S. PATENT DOCUMENTS

| | | | |
|---|---|---|---|
| 5,958,651 | A | 9/1999 | Van Hoof et al. |
| 5,991,798 | A | 11/1999 | Ozaki et al. |
| 5,995,481 | A | 11/1999 | Mecca |
| 5,997,976 | A | 12/1999 | Mueller et al. |
| 6,031,808 | A | 2/2000 | Ueno |
| 6,035,329 | A | 3/2000 | Mages et al. |
| 6,047,292 | A | 4/2000 | Kelly et al. |
| 6,117,284 | A | 9/2000 | Mueller |
| 6,124,011 | A | 9/2000 | Kern |
| 6,160,787 | A | 12/2000 | Marquardt, Jr. et al. |
| 6,195,693 | B1 | 2/2001 | Berry et al. |
| 6,212,158 | B1 | 4/2001 | Ha et al. |
| 6,261,403 | B1 | 7/2001 | Gerigk et al. |
| 6,309,496 | B1 | 10/2001 | Van Hoof |
| 6,309,727 | B1 | 10/2001 | Mueller et al. |
| 6,317,407 | B1 | 11/2001 | Takemura et al. |
| 6,317,779 | B1 | 11/2001 | Gile et al. |
| 6,341,375 | B1 | 1/2002 | Watkins |
| 6,343,060 | B1 * | 1/2002 | Ko ........................ 369/275.1 |
| 6,361,845 | B1 | 3/2002 | Kern |
| 6,368,435 | B1 | 4/2002 | Kempf |
| 6,396,798 | B1 | 5/2002 | Takemura et al. |
| 6,418,111 | B1 | 7/2002 | Takemura et al. |
| 6,438,232 | B1 | 8/2002 | Mages et al. |
| 6,440,248 | B1 | 8/2002 | Mueller |
| 6,480,462 | B2 | 11/2002 | Ha et al. |
| 6,500,297 | B1 * | 12/2002 | Paulus et al. ............ 156/275.5 |
| 6,527,538 | B1 | 3/2003 | Pickutoski et al. |
| 6,564,255 | B1 | 5/2003 | Mobini et al. |
| 6,580,683 | B1 | 6/2003 | Braitberg et al. |
| 6,587,424 | B2 | 7/2003 | Kuroda et al. |
| 6,628,603 | B1 | 9/2003 | Kam et al. |
| 6,678,237 | B1 | 1/2004 | Edwards et al. |
| 6,725,258 | B1 | 4/2004 | Bick et al. |
| 6,726,973 | B2 | 4/2004 | Mueller |
| 6,814,825 | B2 | 11/2004 | Becker et al. |
| 6,896,829 | B2 | 5/2005 | Kern et al. |
| 7,325,287 | B2 | 2/2008 | Sweeney |
| 7,419,045 | B2 | 9/2008 | Kelsch |
| 7,535,806 | B2 | 5/2009 | Fumanti |
| 7,564,771 | B2 | 7/2009 | Sweeney |
| 2001/0042111 | A1 | 11/2001 | Douzono |
| 2002/0071382 | A1 * | 6/2002 | Netsu et al. ................ 369/291 |
| 2003/0152019 | A1 * | 8/2003 | Thompson et al. ....... 369/275.4 |
| 2003/0229679 | A1 | 12/2003 | Yoo et al. |
| 2004/0002018 | A1 | 1/2004 | Oishi et al. |
| 2004/0008612 | A1 * | 1/2004 | Tsujita et al. ............... 369/283 |
| 2004/0044900 | A1 | 3/2004 | Wang et al. |
| 2004/0052203 | A1 * | 3/2004 | Brollier ..................... 369/273 |
| 2004/0134603 | A1 | 7/2004 | Kobayashi et al. |
| 2004/0184390 | A1 | 9/2004 | Oishi |
| 2004/0202097 | A1 * | 10/2004 | Oyake et al. ................ 369/283 |
| 2004/0257929 | A1 * | 12/2004 | Suzuki ..................... 369/44.28 |
| 2004/0264361 | A1 | 12/2004 | Kondo |
| 2005/0007944 | A1 * | 1/2005 | Uchiyama et al. ........ 369/275.5 |
| 2005/0024993 | A1 * | 2/2005 | Kurita et al. ............. 369/13.41 |
| 2005/0031778 | A1 | 2/2005 | Inoue |
| 2005/0036423 | A1 * | 2/2005 | Ichimura et al. ......... 369/59.11 |
| 2005/0039675 | A1 | 2/2005 | Kang et al. |
| 2005/0042371 | A1 | 2/2005 | Ushida et al. |
| 2005/0048250 | A1 | 3/2005 | Yamaga et al. |
| 2005/0052985 | A1 | 3/2005 | Senshu et al. |
| 2005/0053728 | A1 | 3/2005 | Komaki |
| 2005/0053752 | A1 | 3/2005 | Komaki |
| 2005/0072336 | A1 | 4/2005 | Itoh et al. |
| 2005/0072518 | A1 | 4/2005 | Komaki et al. |
| 2005/0109454 | A1 | 5/2005 | Katoh et al. |
| 2005/0112319 | A1 | 5/2005 | Itoh et al. |
| 2005/0132395 | A1 | 6/2005 | Hisada et al. |
| 2005/0147809 | A1 | 7/2005 | Hongo et al. |
| 2005/0158504 | A1 | 7/2005 | Itoh et al. |
| 2005/0175771 | A1 | 8/2005 | Hisada |
| 2005/0219991 | A1 * | 10/2005 | Van Den Oetelaar et al. ........................ 369/275.1 |
| 2006/0023598 | A1 | 2/2006 | Babinski et al. |
| 2006/0062131 | A1 * | 3/2006 | Nagata et al. ............ 369/275.1 |
| 2006/0072428 | A1 * | 4/2006 | Marshall et al. ............. 369/126 |
| 2006/0101634 | A1 | 5/2006 | Sweeney |
| 2006/0104190 | A1 | 5/2006 | Babinski |
| 2006/0165419 | A1 | 7/2006 | Musto |
| 2006/0181706 | A1 | 8/2006 | Sweeney |
| 2006/0222808 | A1 | 10/2006 | Pickutoski et al. |
| 2006/0270080 | A1 | 11/2006 | Rinaldi |
| 2006/0274617 | A1 | 12/2006 | Musto et al. |
| 2007/0008861 | A1 | 1/2007 | Fumanti |
| 2007/0014224 | A1 | 1/2007 | Sweeney |
| 2007/0029167 | A1 | 2/2007 | Kelsch |
| 2007/0090006 | A1 | 4/2007 | Kelsch |

OTHER PUBLICATIONS

U.S. Appl. No. 11/715,249, filed Mar. 6, 2007.
U.S. Appl. No. 11/726,968, filed Mar. 22, 2007.
U.S. Appl. No. 11/705,682, filed Feb. 13, 2007 of Michael Parette.
U.S. Appl. No. 11/715,249, filed Mar. 6, 2007 of William R. Mueller et al.
U.S. Appl. No. 11/726,968, filed Mar. 22, 2007 of Lewis Gensel et al.
U.S. Appl. No. 11/936,625, filed Nov. 7, 2007 of Petrus Hubertus Van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.

* cited by examiner

FIG. 1A
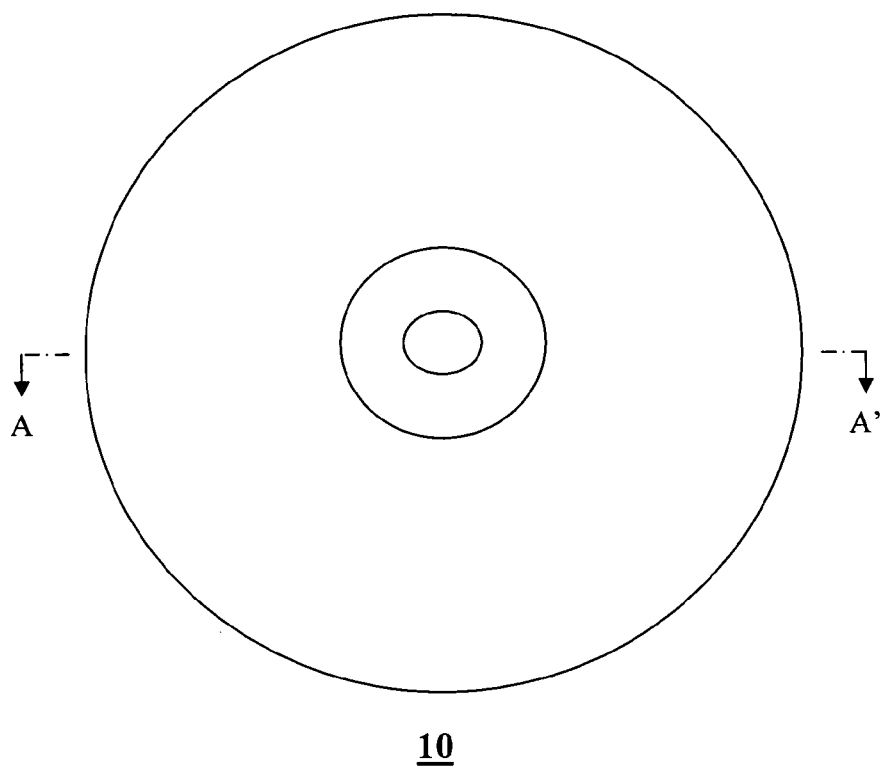
10
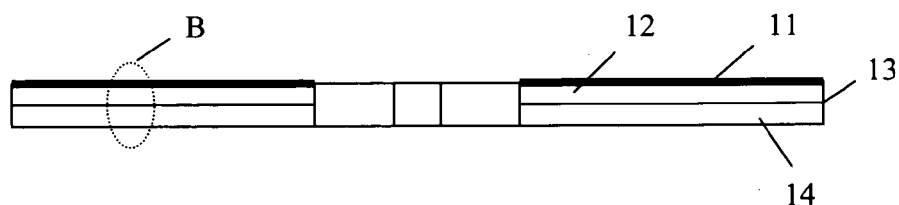
FIG. 1B

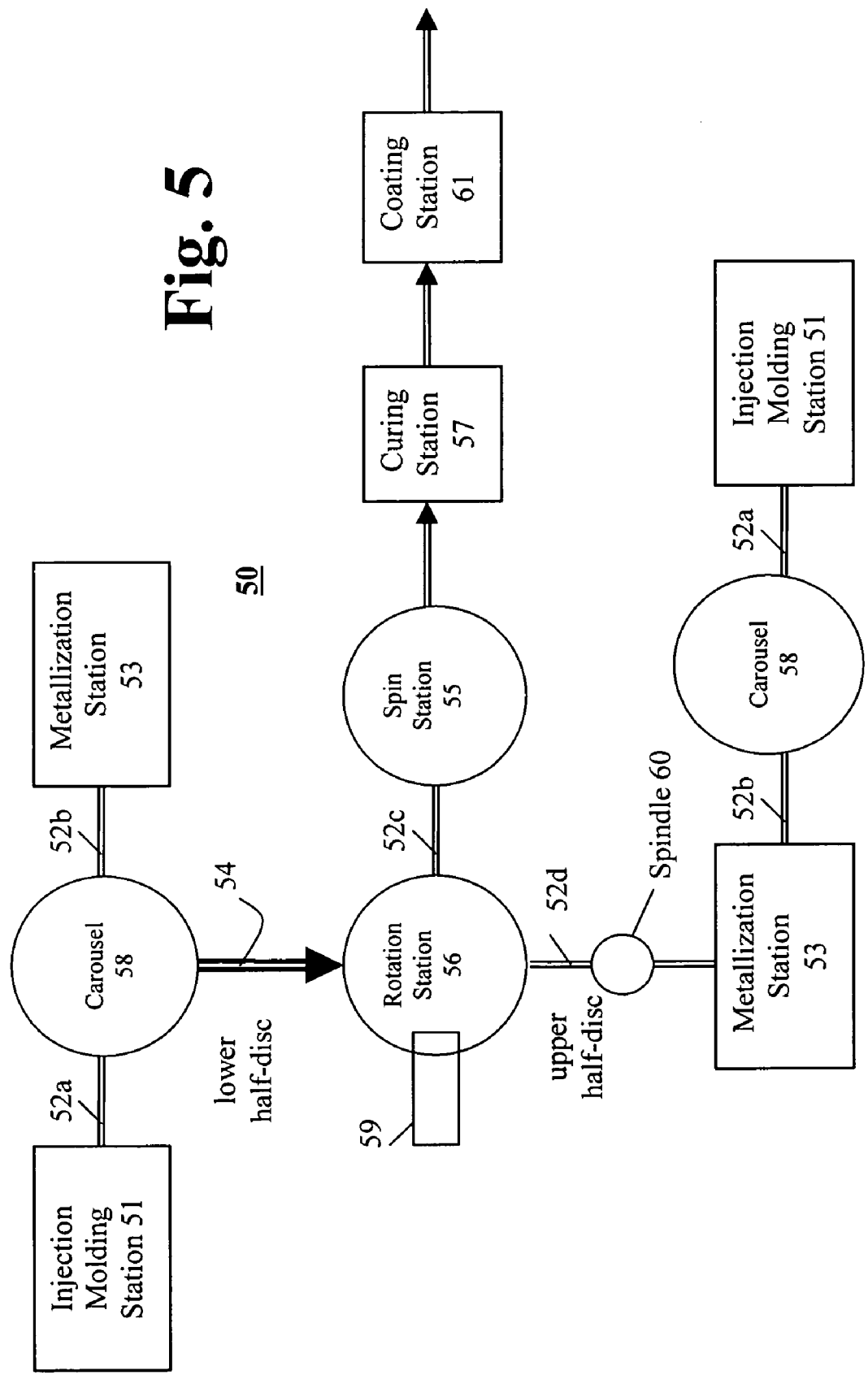

Fig. 6C
BD half-disc
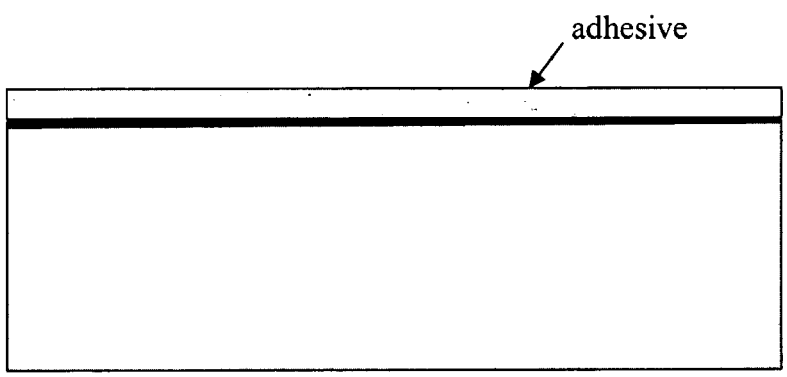
adhesive   S65
DVD-5 half-disc
Fig. 6D
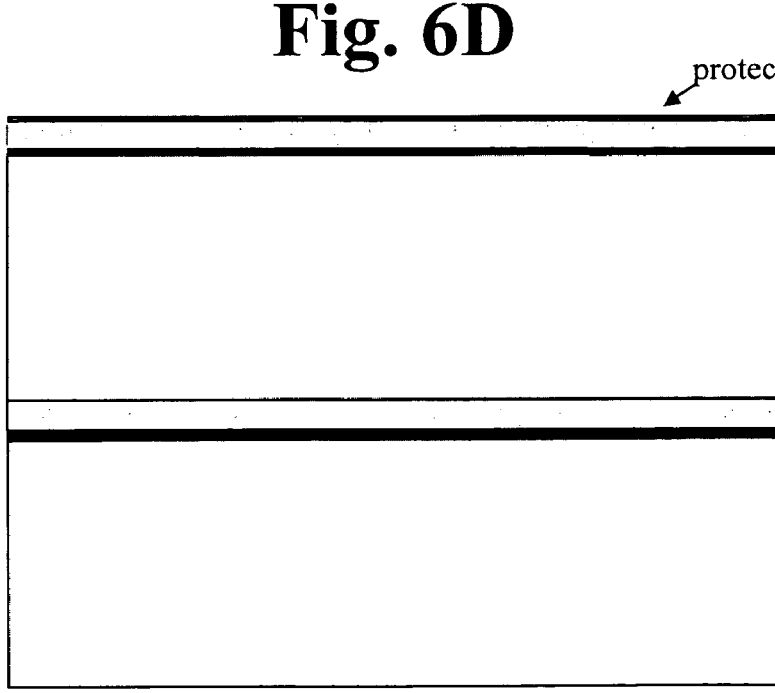
protective layer   S67
cover layer
BD half-disc
DVD-5 half-disc

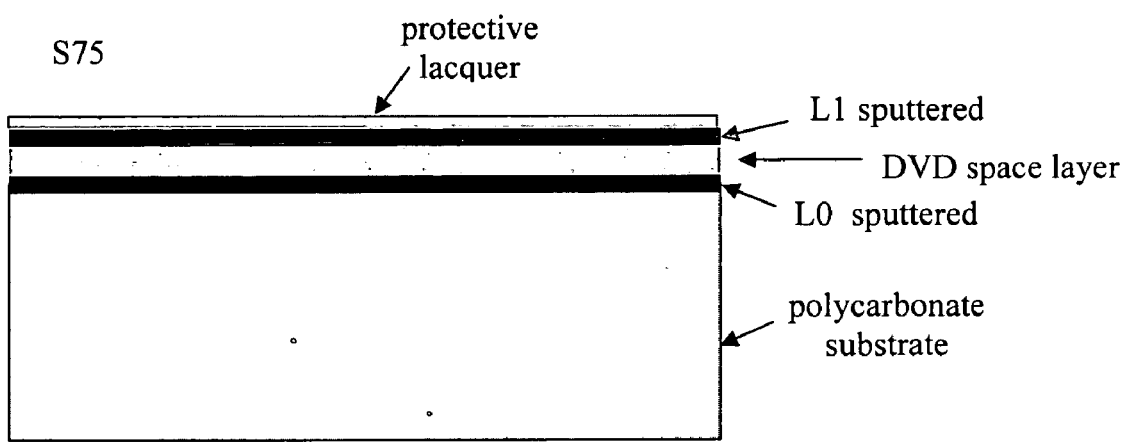
Fig. 7C
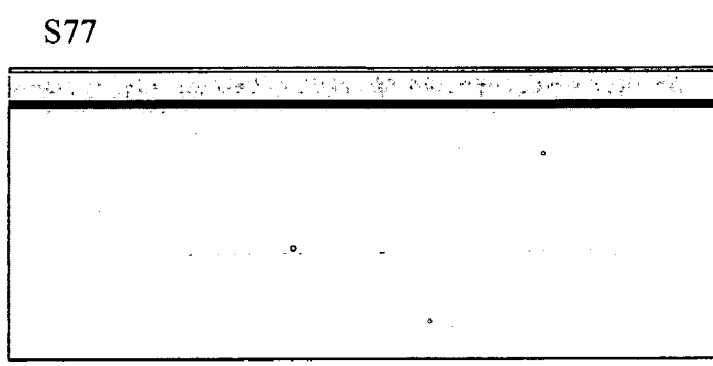
Fig. 7D
BD half-disc
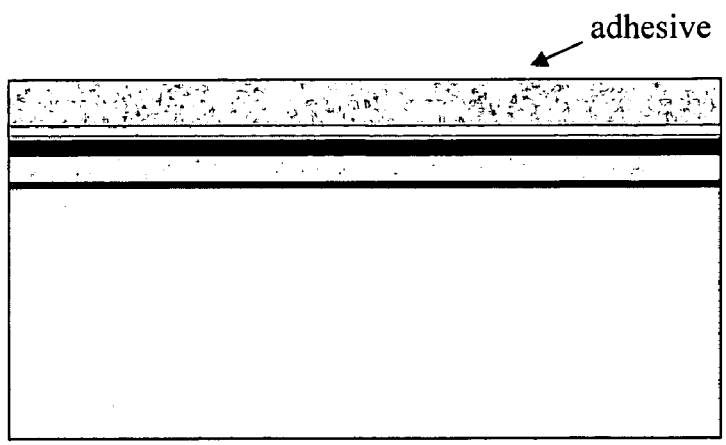
DVD-9 half-disc

MULTI-PURPOSE HIGH-DENSITY OPTICAL DISC

CROSS-REFERENCE TO RELATED APPLICATION

This application claims the benefit of U.S. Provisional Application No. 60/733,598, filed Nov. 3, 2005 and entitled "MULTI-PURPOSE HIGH-DENSITY OPTICAL DISC".

TECHNICAL FIELD

This application relates to optical storage media. In particular, the application relates to an optical recording medium comprising a high-density half-disc bonded to another half-disc.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is pre-recorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as HD DVD and BD (each of which includes read-only, recordable and rewritable formats). The popularity of optical storage media driven by advancements in computer, information communication and multimedia technologies has been accompanied also by demands for a higher density and a greater capacity of optical storage media. HD DVD and BD provide high density formats which attempt to meet such demands.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master in a mastering process. A metallized glass master is used in an electroforming process to form (typically, metal) stampers. A stamper is used on one side of an injection molding cavity to emboss a layer of pits and lands on a transparent polymer substrate formed by injection molding. The information bearing surface of the substrate is then covered with a reflective film (of metal or alloy) or the like, to form an information layer. In the case of a CD, a plastic protective coating is applied over the reflective film, and then art (for example, a picture, a design, text, etc.) is typically printed on the upper surface of the disc (that is, on the side of the substrate which bears the information layer), to form an end product which is 1.2 mm thick. In the case of DVDs, two half-thickness substrates (that is, approximately 0.6 mm each) are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.), with the information layer being shielded from the external environment by the half-thickness substrates as cover layers. A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disc also uses multiple layers beginning with a polycarbonate plastic substrate containing a shallow spiral groove extending from the inside to the outside diameter of the disc. A DVD-RW disc (or a DVD-RAM disc) may additionally inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disc, and a pit or mark in a recordable or rewritable optical disc). During erase, the laser (in a process called "annealing") changes the amorphous areas back into more crystalline areas.

Some exemplary optical disc manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973 and 6,896,829, which are incorporated by reference herein in their entireties in order to more fully describe the state of the art as of the date of the subject matter described and claimed herein. Additional exemplary techniques are discussed in U.S. Pat. Nos. 4,995,799, 5,766,359, 5,800,687, 5,863,328, 5,863,399, 5,913,653, 6,261,403, 6,368,435 and 6,814,825, which are also incorporated by reference herein in their entireties.

HD-DVD format discs can be replicated using a process similar to the process for forming a DVD disc, except that the minimum pit length is shorter and therefore the laser beam recorder used in the mastering process must be adapted to form the shorter pits.

BD format discs are typically manufactured by injection molding a 1.1 mm substrate with pits and sputtering a reflective layer over the pits to form an information layer, and applying a 0.10 mm transparent cover layer over the information layer. This method of manufacture and construction is not preferred for several reasons. First, this method requires dedicated equipment substantially different from DVD equipment. In addition, the manufacturing cycle time, a principal factor in manufacturing cost, is largely dependent on the injection molding cooling time which is inherently longer with a relatively thick 1.1 mm versus 0.6 mm substrate. Further, since the information surface is 0.1 mm below the surface, the remaining 1.1 mm of the disc is essentially not used.

To address some of these concerns Sanyo Corp of Japan has announced development of a BD/DVD disc wherein the DVD layer which resides a nominal 0.6 mm below the surface is read through the BD layer. This process and construction contains several significant issues. In order to read the DVD layer the BD layer must be coated with a special reflective layer able to be reflective to the BD read laser and simultaneously be transparent to the DVD read laser. The optical properties including the clarity and birefringence of the BD disc substrate and the bonding adhesive for such a BD/DVD disc must be carefully controlled in order to read the DVD layer, in comparison to a "BD only" disc. This significantly reduces yields and increases cost. Since both information surfaces in this disc must be read from one side of the disc, the BD player must contain a more sophisticated method of interpreting which surface to play upon disc introduction.

There is a need for a multi-use high-density optical recording medium which does not have the limitations described above.

SUMMARY

This disclosure describes an optical recording medium that can be largely constructed using typical DVD manufacturing equipment, offers additional utility by nature of an additional information surface or additionally functioning second substrate, and can be manufactured at faster rates then conventional BD manufacture. Additionally, the optical recording medium does not have the additional manufacturing or player reading complexities of other proposals.

In one embodiment, the optical recording medium includes a first half-disc and a second half-disc. The first half-disc includes a substrate and an information layer (including a reflective layer) formed on a first side of the substrate. The second half-disc is bonded by an adhesive to a second side of the substrate of the first half-disc. In addition, a cover layer is formed over the first reflective layer. The cover layer has a thickness of approximately 0.1 mm. The substrate of the first half-disc has a thickness in a range of 0.3 mm to 1.0 mm. The first and second half-discs together have a combined thickness in a range of 0.8 mm to 1.3 mm.

The application also describes methodologies for manufacturing the optical recording medium. In one embodiment, a method for manufacturing an optical recording medium includes (a) molding a substrate for a first half-disc, the substrate having a thickness in a range of 0.3 mm to 1.0 mm, (b) forming a first information layer for the first half-disc by sputtering a reflective layer over an information-bearing first side of the substrate, (c) bonding a second half-disc with an adhesive to a second side of the substrate of the first half-disc, wherein the first and second half-discs together have a combined thickness in a range of 0.8 mm to 1.3 mm, and (d) applying a cover layer over the information layer of the first half-disc, wherein the cover layer has a thickness of approximately 0.1 mm.

BRIEF DESCRIPTION OF THE DRAWINGS

The features of the present application can be more readily understood from the following detailed description with reference to the accompanying drawings wherein:

FIG. 1A shows a plan view of an optical recording medium, according to an exemplary embodiment of the present disclosure;

FIG. 1B shows a sectional view of the optical recording medium cut along the line AA' shown in FIG. 1A;

FIG. 5 shows a schematic diagram illustrating a system for manufacturing optical recording media, according to an exemplary embodiment;

FIGS. 6A-6D graphically illustrate an example of a process for manufacturing an optical recording medium consisting of a BD half-disc plus a DVD-5 half-disc; and FIGS. 7A-7D graphically illustrate an example of a process for manufacturing an optical recording medium consisting of a BD half-disc plus a DVD-9 half-disc.

DETAILED DESCRIPTION

Figure 1C:
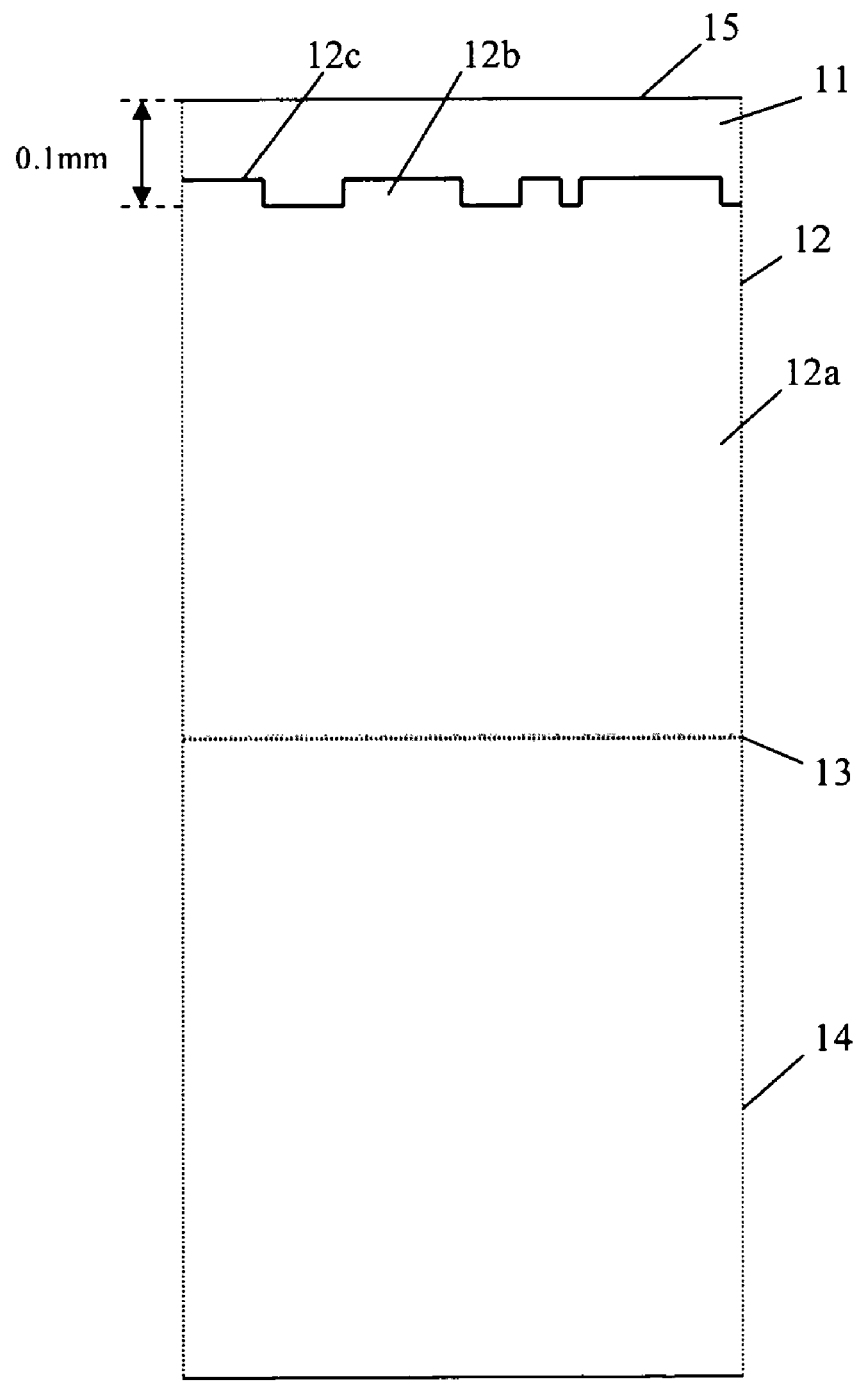
FIG. 1C shows an exploded, notional view along a track direction of section B in FIG. 1B.
Figure 2:
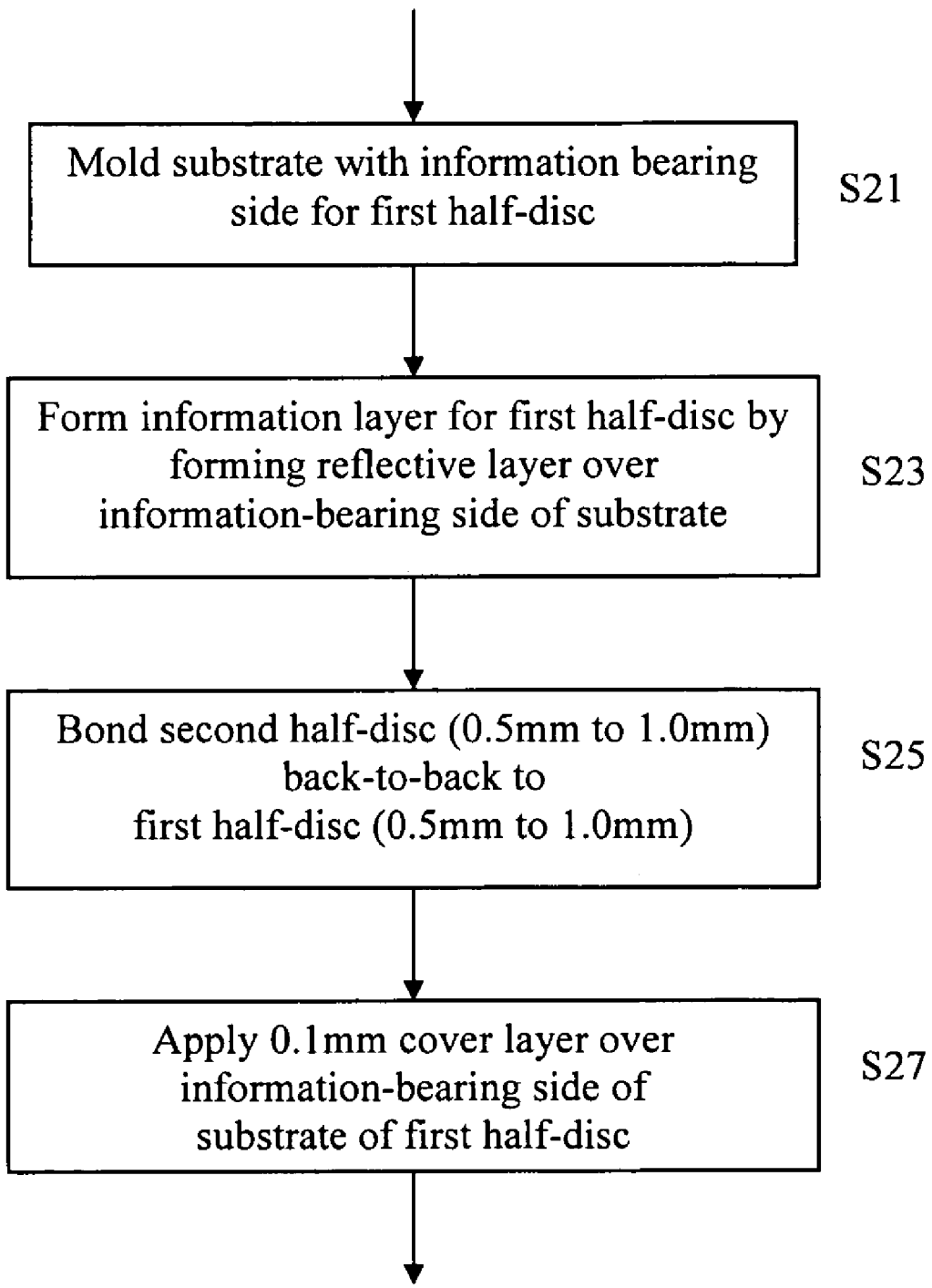
FIG. 2 shows a flow chart illustrating a method for manufacturing an optical recording medium, according to an exemplary embodiment.

This application provides a multi-purpose high-density optical recording medium which can be manufactured with minimal modification of existing optical disc manufacturing technology. A half-disc is bonded back-to-back to another half-disc, with an additional 0.1 mm cover layer applied thereto.

The term "half-disc" is used generally in this disclosure to include any disc including a substrate and having a thickness of 0.3 mm to 1.0 mm. The two half-discs do not need to be the same thickness. However, the two half-discs plus the 0.1 mm cover layer together form an optical recording medium having a thickness in a range of 0.9 mm to 1.4 mm, and therefore the two half-discs together have a combined thickness in a range of 0.8 mm to 1.3 mm. For example, if one half-disc has a thickness of 0.3 mm, then the other half-disc should have a thickness in a range of 0.5 mm to 1.0 mm. It is not desirable to have a half-disc having a thickness less than 0.3 mm, since it will be difficult to mold and handle such a half-disc.

Some exemplary embodiments will be discussed below with reference to FIGS. 1A through 5.

As an example (FIGS. 1A through 1C), an optical recording medium 10 comprises a cover layer 11, a half-disc 12 and a half-disc 14. The half-disc 12 comprises a substrate 12a and an information layer 12b including a reflective layer 12c, with the cover layer 11 being over the reflective layer 12c on one side of the half-disc 12, and the half-disc 14 being bonded via adhesive agent 13 to the other side of the half-disc 12. The substrate 12 has a thickness in a range of 0.3 mm to 1.1 mm, and the cover layer 11 has a thickness of approximately 0.1 mm. Further, the first half-disc 12 and second half-disc 14 together have a combined thickness in a range of 0.8 mm to 1.3 mm. Therefore, the optical recording medium 10 has a thickness in a range of 0.9 mm to 1.4 mm.

The substrate 12a is preferably injection molded from a material used conventionally for optical disc substrates, such as polycarbonate resins, acrylic resins (for example, polymethyl methacrylate, i.e. PMMA), polyolefine resins, or the like. Since the substrate 12a does not need to be optically transparent (because a laser beam is incident through the cover layer), the substrate 12a may alternatively be made of another plastic material, glass, ceramics, and the like. However, if the substrate is formed through injection molding, the material of the substrate 12a is preferably one suitable for injection molding.

The reflective layer 12c can be deposited by a sputtering process on the information-bearing side of the substrate 12a. A material of the reflective layer may include a metallic element, semi-metallic element, semiconductor element, or a composite thereof. Suitable materials for the reflective layer include Al, Au, Ag, Cu, Ni, In, Ti, Cr, Pt, Si, alloy, etc. The reflective layer is preferably a thin film having a thickness of 5 nm to 200 nm.

The cover layer 11 is made of a light transmitting material (for example, radiation curable resin), and may be formed by utilizing any of various methodologies. For example, the light transmitting cover layer may be formed by a spin coating technique. See, for example, U.S. Patent Application Publication No. US2005/0042371A1 (the entire contents of which are incorporated by reference herein). As another example, the cover layer 11 may be a thin-layer plastic sheet having a high optical transmissivity (such as, for example, polycarbonate, TAC, polyethylene terephthalate, or the like) which is punched out in a disc shape, and then bonded on the information layer 12b (with, for example, an ionizing radiation curable adhesive). The plastic sheet may be a laminate sheet constituted by an adhesive sheet having a predetermined form which is laminated onto a release sheet and wound into a roll. See, for example, U.S. Patent Application Publication No. US2005/0109454A1 (the entire contents of which are incorporated by reference herein).

A protective hard coat 15 which has properties of scratch resistance and abrasion resistance preferably covers the cover layer 11. The hard coat may be formed on the cover layer 11 by applying a hardcoat agent composition (for example, UV hardening resin) on the cover layer, followed by curing through irradiation with active energy rays such as ultraviolet rays, electron rays or visible rays. Examples of a hardcoat composition and techniques for applying the composition are described in U.S. Patent Application Publications Nos. US2005/0072336A1, US2005/0112319A1 and US2005/0158504A1, the entire disclosures of which are incorporated by reference herein. In another example, a hard coat film including the cover layer and the hard coat may be formed and then the hard coat film is bonded on the information layer. See, for example, U.S. Patent Application Publication No. US2005/0147809A1 (the entire contents of which are incorporated by reference herein).

The half-disc 12 in combination with the cover layer 11 and the protective hardcoat may comply with the requirements of, for example, the BD read-only format. For such a half-disc, the information layer 12b includes a series of pits embossed in a plane of land (by a stamper in the injection molding process), all of which being covered by the reflective layer 12c. In addition, the information layer 12b comprises an information track having pits with a minimum length along the track in a range of 138 nm to 160 nm. The information layer 12b can comprise information marks configured for reading using a laser with a wavelength in a range of 400 nm to 420 nm and a numerical aperture of 0.85. The information layer 12b can have information capacity of 23 GBytes or more.

A method for manufacturing an optical recording medium (FIG. 2), according to an example of this disclosure, includes molding a substrate for a first half-disc (step S21), forming a reflective layer over the information-bearing side of the substrate (step S23), bonding a second half-disc to a second side of the substrate of the first half-disc (step S25), and applying a cover layer over the information layer of the first half-disc (step S27), wherein the cover layer has a thickness of approximately 0.1 mm. Some additional examples of the method are discussed infra.

The method may additionally include forming a protective hardcoat on the cover layer (as discussed above), and testing a readability of the first information layer by using a laser with a wavelength in a range of 400 nm to 420 nm and a numerical aperture of 0.85.

Half-discs for the multi-purpose optical recording medium are preferably produced by utilizing existing proven mastering technologies and by bonding the half discs back-to-back utilizing pre-existing bonding technologies. Bonding techniques for bonding two thin discs back to back are discussed, for example, in U.S. Pat. Nos. 5,900,098 and 5,932,042, the entire contents of each of which are incorporated herein by reference. See also, for example, U.S. Patent Application Publication No. US2004/0134603A1 (the entire contents of which are incorporated by reference herein).

The half-disc 12 can include one information layer (FIG. 1C) or multiple information layers (not shown). In the case of the half-disc having two information layers, the upper information layer (that is, closer to the 0.1 mm cover layer) is covered by a semi-reflective layer (for example, gold, silicon, silver, alloy, etc.) and the lower information layer (that is, further from the 0.1 mm cover layer) is covered by a reflective layer (for example, aluminum, etc.). Techniques for forming dual-layer half-discs (that is, both information layers being readable from the same disc side) is well-understood (for example, U.S. Pat. No. 6,117,284, the entire contents of which are incorporated herein). See also, for example, U.S. Patent Application Publications Nos. US2005/0002018A1 and US2005/0072518A1, the entire disclosures of which are incorporated by reference herein.

The optical recording medium 10 can be single-sided or double-sided.

Figure 3A:
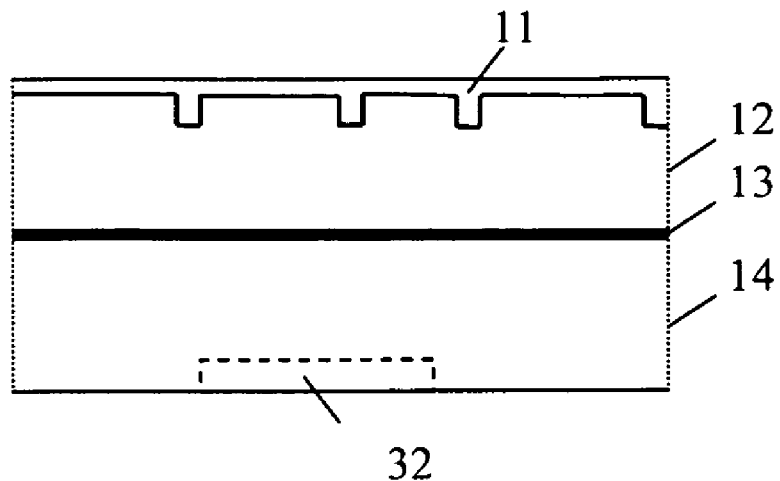
FIG. 3A shows a notional view along a track direction of a portion of an optical recording medium, according to another exemplary embodiment, comprising a BD format half-disc bonded to another half-disc with an RFID chip embedded therein.
Figure 3B:
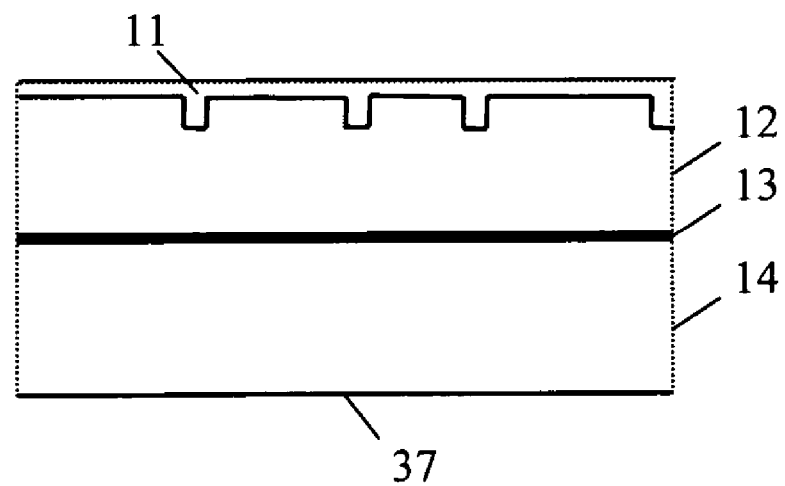
FIG. 3B shows a similar notional view of a portion of an optical recording medium, according to another exemplary embodiment, comprising a BD format half-disc bonded to another half-disc with printing applied to a surface thereof.
Figure 4A:
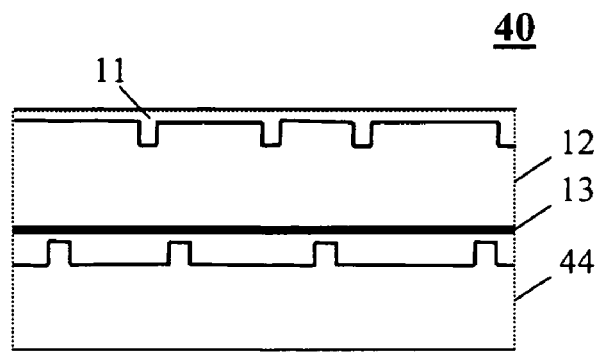
FIG. 4A shows a similar notional view of a portion of an optical recording medium, according to an exemplary embodiment, comprising a BD format half-disc bonded to an HD-DVD format half-disc.
Figure 4B:
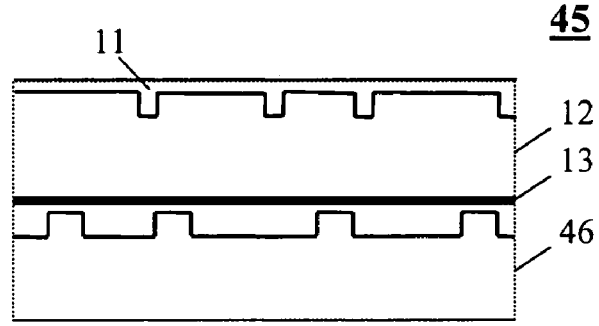
FIG. 4B shows a similar notional view of a portion of an optical recording medium, according to another exemplary embodiment, comprising a BD format half-disc bonded to an DVD-5 format half-disc.
Figure 4C:
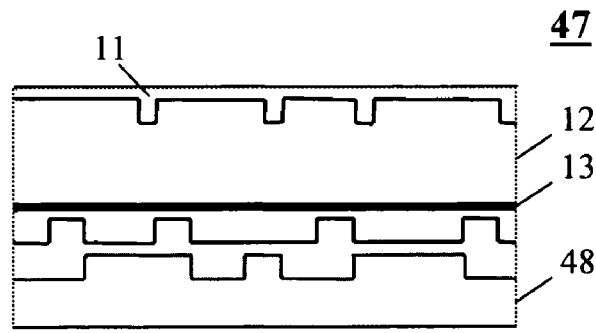
FIG. 4C shows a similar notional view of a portion of an optical recording medium, according to another exemplary embodiment, comprising a BD format half-disc bonded to an DVD-9 format half-disc.
Figure 6A:
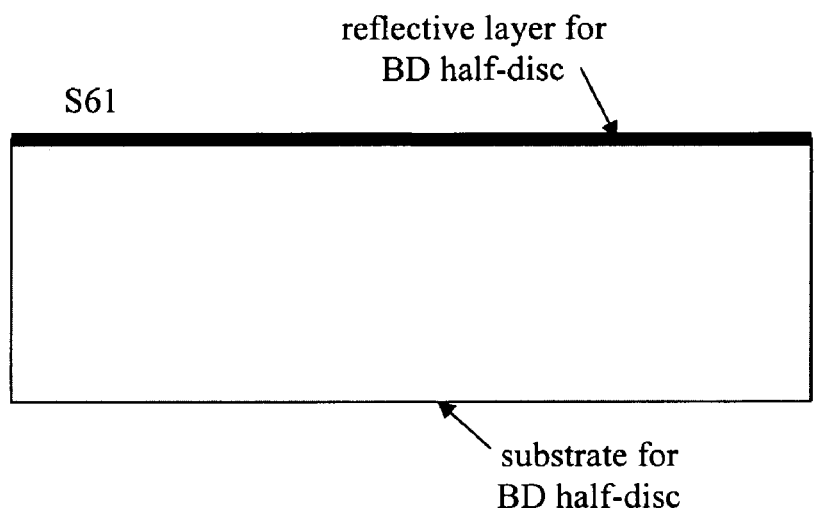
Figure 6B:
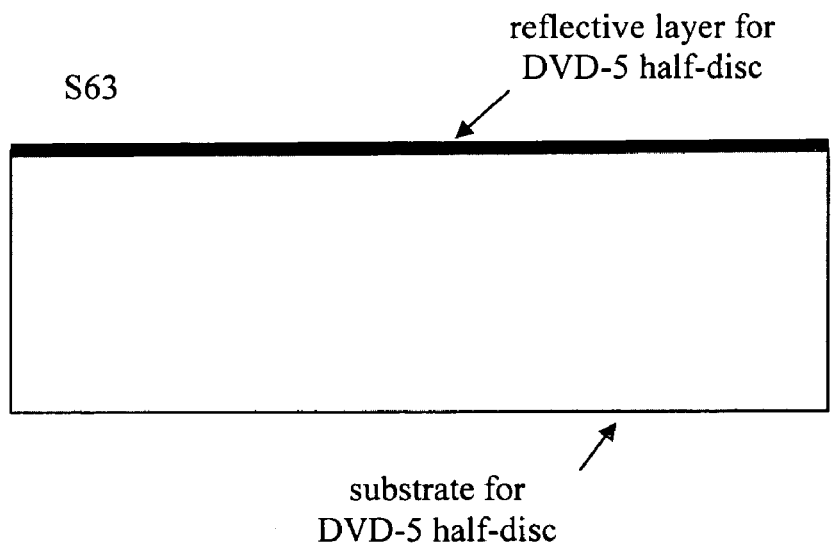
Figure 7A:
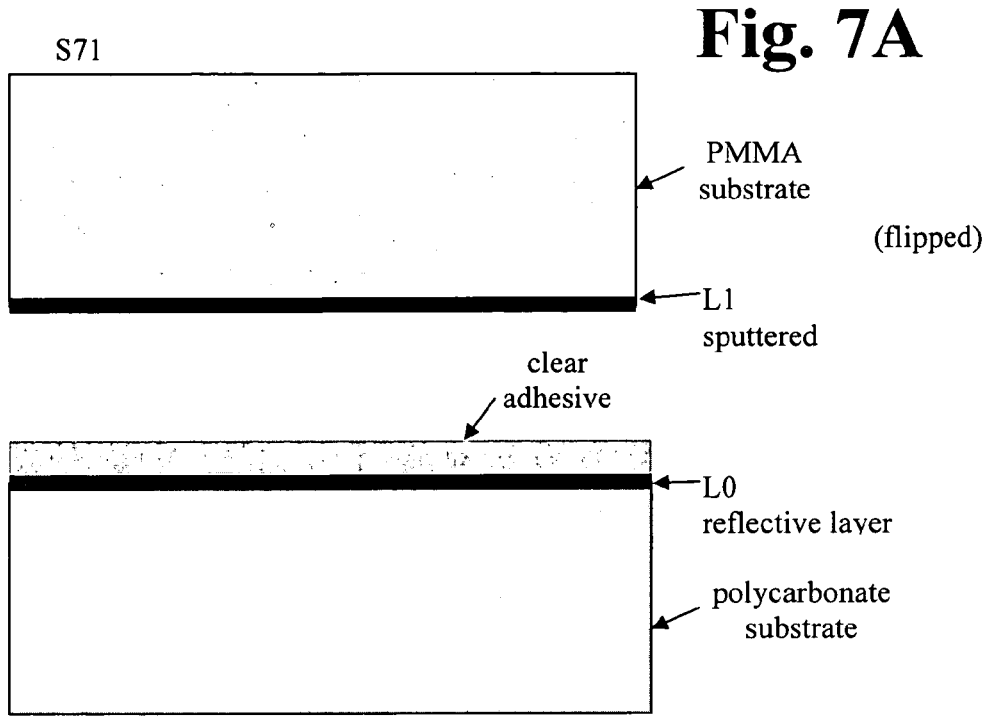
Figure 7B:
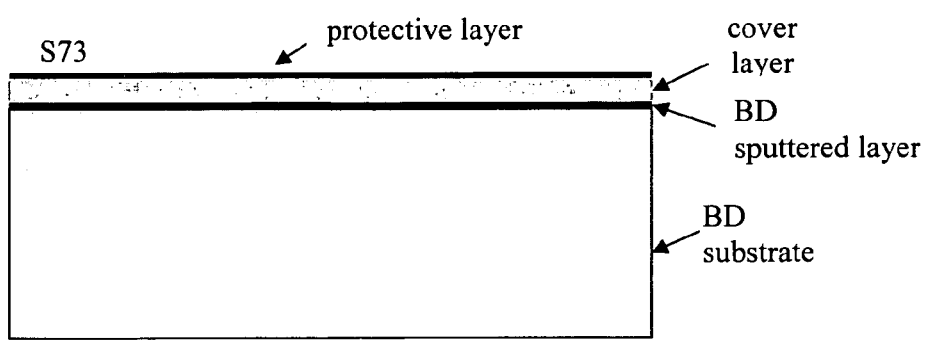

In the case of a single-sided disc, the half-disc 14 may be a molded blank having no information layer. In such an instance, the optical recording medium 10 is simply a BD format disc, made with minimal modification of existing optical disc manufacturing technology (and therefore at lower cost than newly designed techniques for manufacturing BD format discs) to obtain a high density disc with significantly shorter minimum pit lengths. In such an example, a RFID chip 32 may be embedded in the half-disc 14 (FIG. 3A). See, for example, U.S. Patent Application Publication No. US2005/0052985A1 and U. S. Pat. No. 5,905,798 (the entire contents of each of which are incorporated by reference herein). In addition, printing 37 can be applied to a surface of the half-disc 14 (FIG. 3B).

A double-sided optical recording medium 10 provides flexibility in that the disc can include multiple formats back-to-back on the same disc and the content can be provided in multiple formats on one optical recording disc. The double-sided optical recording disc may be a combination of a BD format half-disc and an HD-DVD format half-disc. Each of HD-DVD and BD provides a pre-recorded (read-only) format and a pre-grooved (rewritable or write-once read-many times) format. Each format is designed for use with blue laser technology, in order to achieve higher data density, such as would be required for recording high definition video.

As an example (FIG. 4A), in a double-sided optical recording medium 40, a half-disc 44 includes an information layer comprising a reflective layer is bonded to the half-disc 12. The information layer of the half-disc 44 can have information capacity of 15 GBytes or more, and an information track comprising pits having a minimum length of approximately 204 nm. Further, the information layer can comprise information marks configured for reading using a laser with a wavelength in a range of 400 nm to 420 nm and a numerical aperture of 0.65. In such a case, the half-disc 44 may be an HD-DVD half-disc.

In another example (FIG. 4B), a DVD-5 half-disc 46 (single information layer) is bonded to the half-disc 12. In such a case, the method for manufacturing the optical recording medium may include (i) molding and sputtering a BD format half-disc having a thickness between 0.3 mm and 1.0 mm, (ii) molding and sputtering a DVD-5 format half-disc having a thickness between 0.3 mm and 1.0 mm [which may be concurrent with (i)], (iii) bonding the BD format half-disc and the DVD-5 format half-disc, and (iv) applying a cover layer over the surface of the BD format half-disc (and optionally a protective coating over the cover layer).

In yet another example (FIG. 4C), a DVD-9 half-disc 48 (dual information layers) is bonded to the half-disc 12. In such a case, the method for manufacturing the optical recording medium may include (a) making a 1.2 mm DVD-9 interim disc (such as by utilizing the process disclosed in U.S. Pat. No. 6,117,284), (b) stripping off PMMA (such as by utilizing the surface transfer process of U.S. Pat. No. 6,117,284) leaving 0.6 mm DVD-9 half-disc, (c) making a 0.6 mm BD format half-disc, including molding and sputtering and applying a cover layer (and optionally a protective coating), (d) applying protective lacquer to the DVD-9 half-disc, and (e) bonding the BD format half-disc (including cover layer) and the DVD-9 format-half-disc.

An example of a system 50 for manufacturing the multi-purpose optical recording media of this disclosure will be described with reference to FIG. 5. Each optical disc has an upper half-disc and a lower half-disc.

In the system 50 an injection molding station 51 injects a molten transparent polycarbonate plastic into a mold cavity, having a stamper on one face to produce a clear plastic half-disc with pits impressed on one side. The molded half-disc is placed by a robotic arm 52a in a carousel 58 which rotates to bring the half-disc to the metallization station 53 where the half-disc is lifted by a robotic arm 52b and brought into the metallization station, coated upon the pitted surface of the half-disc with a reflective metal layer and returned to the carousel 58. The half-disc travels upon disc transport belt 54 during which time it cools somewhat. The corresponding upper half-disc waits upon a spindle 60 for assembly. The lower half-disc is moved by a robotic arm (not shown) from the transport belt 54 to a rotation station 56. A fluid dispensing arm 59 places a ring of an ultra-violet curable adhesive on the lower half-disc as it is slowly rotated through a full rotation on a spacer chuck at the rotation station 56. A robotic arm 52d then removes the upper half-disc from the spindle and places it upon the spacer chuck, so that it does not contact the adhesive.

In the case of a process for manufacturing optical discs in which only one half-disc is information bearing, only a single metallization station 53 is needed to be included. On the other hand, in a process for manufacturing optical discs in which both half-discs are information bearing, two injection molding stations and two metallization stations would typically be included, and a transport mechanism brings the two half-discs to an assembly area where adhesive is applied to one of the half-discs.

Next, the pair of half-discs is lifted by a robotic arm 52c to a spin station 55 where the upper half-disc comes into contact with the adhesive and the sandwich of half-discs and adhesive is rapidly spun to spread the adhesive. Some adhesive will typically extrude from between the sandwich of half-discs and cover the sides of the half-discs, acting as a protective coating.

The composite is then transported to a curing station 57 where the composite is exposed to ultra-violet light of low intensity adjusted so that primarily the inner and outer circumferences of the half-discs are bonded. If the disc has a metallization layer that does not extend to either the internal or external radii of the disc, it is sufficient to bathe the entire disc in ultra-violet radiation and rely mainly upon the shielding by the metallization layer to effect the tacking of the surfaces together at their inner and outer circumferences. The composite is exposed to sufficient ultra-violet light to cure the adhesive.

Next, the bonded half-discs are transported to a coating station 61 where a cover layer is formed on the surface of one of the half-discs, and a protective hardcoat is applied to the cover layer.

An example of a process for manufacturing (such as using system 50 in FIG. 5) an optical recording medium consisting of a BD half-disc plus a DVD-5 half-disc is shown graphically in FIGS. 6A-6D. A 0.58 mm substrate with pits impressed on one side is formed by injection molding for the BD half-disc, and a reflective layer is sputtered on the BD half-disc (step S61, FIG. 6A). A 0.58 mm substrate with pits impressed on one side is formed by injection molding for the DVD half-disc, and a reflective layer is sputtered on the DVD-5 half-disc (step S63, FIG. 6B). Steps S61 and S63 may proceed concurrently. The BD half-disc is bonded to the DVD-5 half-disc (step S65, FIG. 6C), for example, using a technique which can be used for bonding two DVD half-discs, except that neither the BD half-disc nor the DVD-5 half-disc is flipped. A 0.10 mm cover layer is applied over the information layer on the BD half-disc (step S67, FIG. 6D), and a hard coat is applied if necessary.

An example of a process for manufacturing an optical recording medium consisting of a BD half-disc plus a DVD-9 half-disc is shown graphically in FIGS. 7A-7D. A DVD-9 interim disc is formed (step S71, FIG. 7A), including molding PMMA with layer L1, molding polycarbonate with layer L0, flipping the PMMA with layer L1, bonding the polycarbonate with layer L0 to the PMMA with layer L1. A BD half-disc is formed (step S73, FIG. 7B), including molding a 0.58 mm substrate with pits embossed thereon, sputtering a reflective layer over the pits, applying a 0.10 mm cover layer over the reflective layer (and apply hard coat if necessary). The PMMA is removed while the layer L1 remains on the DVD 9 interim disc, and a 0.005 mm protective lacquer is applied to form the DVD-9 half-disc (step S75, FIG. 7C). The BD half-disc is bonded to the DVD-9 half-disc (step S77, FIG. 7D).

In describing examples and exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

Further, in the discussion above, read-only format half-discs are posed as examples. It should be apparent after a reading of this patent disclosure, however, that the techniques of this disclosure apply similarly to recordable (write once read many times) and rewritable format half-discs.

What is claimed is:

1. An optical recording medium comprising:
    a first half-disc including a substrate and a first information layer including a first reflective layer formed on a first side of said substrate;
    a second half-disc bonded by an adhesive to a second side of said substrate of the first half-disc; and
    a cover layer over said first reflective layer,
    wherein said cover layer has a thickness of approximately 0.1 mm, said substrate of said first half-disc has a thickness in a range of 0.3 mm to 1.0 mm, and said first and second half-discs together have a combined thickness in a range of 0.8 mm to 1.3 mm, and
    wherein said first half-disc is configured for reading of information marks on the first information layer using a light beam reflected from the information bearing first side of the first half-disc without a reading beam traveling through said adhesive and said substrate of the first half-disc.

2. An optical recording medium as claimed in claim 1, further comprising a protective hardcoat over said cover layer.

3. An optical recording medium as claimed in claim 1, wherein said information layer comprises an information track having pits with a minimum length along the track in a range of 138 nm to 160 nm.

4. An optical recording medium as claimed in claim 1, wherein said first information layer comprises information marks configured for reading using a laser with a wavelength in a range of 400 nm to 421 nm and a numerical aperture of 0.85.

5. An optical recording medium as claimed in claim 1, said first information layer of said first half-disc has information capacity of 23 GBytes or more.

6. An optical recording medium as claimed in claim 1, wherein said optical recording medium is double-sided, and said second half-disc includes a second information layer comprising a second reflective layer, wherein said second information layer has information capacity of 15 GBytes or more.

7. An optical recording medium as claimed in claim 6, wherein said second information layer has an information track comprising pits having a minimum length of approximately 204 nm.

8. An optical recording medium as claimed in claim 6, wherein said second information layer comprises information marks configured for reading using a laser with a wavelength in a range of 400 nm to 420 nm and a numerical aperture of 0.65.

9. An optical recording medium as claimed in claim 1, wherein said optical recording medium is double-sided, and said second half-disc comprises a DVD-5 half-disc.

10. An optical recording medium as claimed in claim 1, wherein said optical recording medium is double-sided, and said second half-disc comprises a DVD-9 half-disc.

11. An optical recording medium as claimed in claim 1, wherein said second half-disc comprises an RFID chip.

12. An optical recording medium as claimed in claim 1, wherein said second half-disc comprises a half-disc molded without an information layer.

13. An optical recording medium as claimed in claim 12, further comprising printing applied to a surface of said second half-disc.

14. An optical recording medium as claimed in claim 1, wherein said first half-disc is configured for reading of information marks on the tint information layer using a light beam reflected from the information bearing first side of the first half-disc without a reading beam traveling through said adhesive and said substrate of the first half-disc and without the reading beam traveling through the substrate of the second half-disc.

15. A method for manufacturing an optical recording medium, the method comprising:
    (a) molding a substrate for a first half-disc, said substrate having a thickness in a range of 0.3 mm to 1.0 mm and an information bearing first side and a second side;

(b) forming a first information layer for said first half-disc by forming a reflective layer over the information-bearing first side of the substrate;

(c) forming a bond between a second half-disc at the second side of said substrate to said substrate of said first half-disc, wherein the first and second half-discs together have a combined thickness in a range of 0.8 mm to 1.3 mm and wherein die first half-disc is configured for reading information marks on the information layer using a light beam reflected from the information bearing first side of the first half-disc without a reading beam traveling through said bond and said substrate of the first half-disc; and (d) applying a cover layer over said information layer of said first half-disc, wherein said cover layer has a thickness of approximately 0.1 mm.

16. The method of claim 15, further comprising testing a readability of said first information layer by using a laser with a wavelength in a range of 400 nm to 420 nm and a numerical aperture of 0.85.

17. The method of claim 15, further comprising forming a second information layer by forming a second information-bearing surface of said second half-disc and a second reflective layer over said second information-bearing surface.

18. The method of claim 15, further comprising testing a readability of said second information layer by using a laser with a wavelength in a range of 400 nm to 420 nm and a numerical aperture of 0.65.

19. The method of claim 15, further comprising embedding a RFID chip at said second half-disc.

20. The method of claim 15, further comprising applying printing to a surface of said second half-disc.

21. An optical recording medium comprising:
a first half-disc including a substrate and a first information layer including a first reflective layer formed on a first side of said substrate;
a second half-disc bonded by an adhesive to a second side of said substrate of the first half-disc; and
a cover layer over said first reflective layer.
wherein said cover layer has a thickness of approximately 0.1 mm, said substrate of said first half-disc has a thickness in a range of 0.3 turn to 1.0 mm, and said first and second half-discs together have a combined thickness in a range of 0.8 mm to 1.3 mm, and
wherein the first half-disc is configured for reading information marks on the first information layer using a light beam reflected from the first side of the first half-disc without a reading beam traveling through said adhesive and said substrate of the first half-disc, and
wherein said first half-disc includes only one information layer.

22. An optical recording medium comprising:
a first half-disc including a substrate and a first information layer including a first reflective layer formed on a first side of said substrate;
a second half-disc bonded by an adhesive to a second side of said substrate of the first half-disc; and
a cover layer over said first reflective layer,
wherein said cover layer has a thickness of approximately 0.1 mm, said substrate of said first half-disc has a thickness in a range of 0.3 mm to 1.0 mm, and said first and second half-discs together have a combined thickness in a range of 0.8 mm to 1.3 mm, and
wherein the first half-disc is configured for reading information marks on the first information layer using a light beam reflected from the first side of the first half-disc without a reading beam traveling through said adhesive and said substrate of the first half-disc, and
wherein said optical recording medium includes at least two read-only information layers.

23. The optical recording medium of claim 22, wherein the first half-disc includes the at least two read-only information layers.

24. The optical recording medium of claim 22, wherein each of the first half-disc and the second half disc includes at least one read-only information layer.

25. An optical recording medium comprising:
a first half-disc including a substrate and a first information layer including a first reflective layer formed on a first side of said substrate;
a second half-disc bonded by an adhesive to a second side of said substrate of the first half-disc; and
a cover layer over said first reflective layer,
wherein said cover layer has a thickness of approximately 0.1 mm, said substrate of said first half-disc has a thickness in a range of 0.3 mm to 1.0 mm, and said first and second half-discs together have a combined thickness in a range of 0.8 mm to 1.3 mm, and
wherein the first half-disc is configured for reading information marks on the first information layer using a light beam reflected front the first side of the first half-disc without a reading beam traveling through said adhesive and said substrate of the first half-disc, and
wherein the first information layer is a plurality of pits and lands formed in said first side of said substrate of the first half-disc.

* * * * *

UNITED STATES PATENT AND TRADEMARK OFFICE
CERTIFICATE OF CORRECTION

PATENT NO.         : 7,684,309 B2                             Page 1 of 1
APPLICATION NO.    : 11/284687
DATED              : March 23, 2010
INVENTOR(S)        : William R. Mueller It is certified that error appears in the above-identified patent and that said Letters Patent is hereby corrected as shown below:

Replace claim 14 at Col. 10, Lines 55-62 with the following:

--14.    An optical recording medium as claimed in claim 1, wherein said first half-disk is configured for reading of information marks on the [[tint]] first information layer using a light beam reflected from the information bearing first side of the first half-disc without a reading beam traveling through said adhesive and said substrate of the second half-disc.--

Signed and Sealed this
First Day of March, 2011

David J. Kappos
*Director of the United States Patent and Trademark Office*